United States Patent [19]
Pankow et al.

[11] Patent Number: 5,566,572
[45] Date of Patent: Oct. 22, 1996

[54] CIRCUITRY TO MINIMIZE STRAY CAPACITANCE EFFECTS IN A CAPACITIVE LIQUID LEVEL MEASUREMENT DEVICE

[75] Inventors: Richard J. Pankow, Easton; J. David Epler, Bethany, both of Conn.

[73] Assignee: United Technologies Corporation, Hartford, Conn.

[21] Appl. No.: 241,265

[22] Filed: May 11, 1994

[51] Int. Cl.[6] .......................... G01F 23/26; G01R 27/26
[52] U.S. Cl. ..................... 73/304 C; 324/611; 324/669; 324/678
[58] Field of Search ................... 324/664, 669, 324/671, 684, 611, 678; 73/304 C

[56] References Cited

U.S. PATENT DOCUMENTS

| | | | |
|---|---|---|---|
| 3,159,786 | 12/1964 | Bayne | 324/684 X |
| 3,639,835 | 2/1972 | Damming, Jr. et al. | 324/61 |
| 3,747,407 | 7/1973 | Wallman | 73/304 |
| 3,768,006 | 10/1973 | Mueller | 73/304 C X |
| 3,801,902 | 4/1974 | Horowitz | 324/61 |
| 3,916,689 | 11/1975 | Donnelly | 73/304 C |
| 4,259,865 | 4/1981 | Myers | 73/304 C |
| 4,337,638 | 7/1982 | Leonard et al. | 73/1 R |
| 4,350,039 | 9/1982 | van Dyke et al. | 73/304 |
| 4,352,159 | 9/1982 | Colby | 364/509 |
| 4,355,363 | 10/1982 | Colby et al. | 364/509 |
| 4,363,239 | 12/1982 | Fahley | 73/304 |
| 4,373,390 | 2/1983 | van Dyke et al. | 73/304 |
| 4,388,828 | 6/1983 | Dougherty | 73/304 C |
| 4,451,894 | 5/1984 | Dougherty et al. | 364/509 |
| 4,545,020 | 10/1985 | Brasfield | 364/509 |
| 4,706,203 | 11/1987 | Ramsdale et al. | 364/509 |
| 4,731,730 | 3/1988 | Hedrick et al. | 364/509 |
| 4,841,227 | 6/1989 | Maier | 324/678 |

FOREIGN PATENT DOCUMENTS 909900 11/1962 United Kingdom ................... 40/7

OTHER PUBLICATIONS

CH-53 Fuel Quantity Gauging—BF Goodrich Aerospace Simmonds Precision Dated: Aug. 1993.

Primary Examiner—William A. Cuchlinski, Jr.
Assistant Examiner—Willie Morris Worth
Attorney, Agent, or Firm—Michael Grillo

[57] ABSTRACT

A time varying excitation current (413) is provided to one side of a capacitive sensor (417), and two signal paths (420,430) are provided between the other side of the capacitive sensor (417) and signal conditioning circuitry (412), each signal path differing from the other according to its polarity. The signal paths conduct monopolar signals from the capacitive sensor the magnitude of which are directly related to the capacitance of the sensor, and bi-polar signals the magnitude of which are directly related to the stray capacitance in the signal lines. The combined monopolar and bi-polar signal currents on each signal line are converted into voltage signals (422,433), and the voltage signals are thereafter differenced (460) to provide a null bi-polar output while providing a constant monopolar voltage level the magnitude of which is directly related to the probe capacitor current.

18 Claims, 4 Drawing Sheets

5,566,572

1

CIRCUITRY TO MINIMIZE STRAY CAPACITANCE EFFECTS IN A CAPACITIVE LIQUID LEVEL MEASUREMENT DEVICE

TECHNICAL FIELD

The present invention relates to circuitry to minimize stray capacitance effects, and more particularly, to circuitry to minimize the effects of stray capacitance on a variable capacitance liquid level measurement device.

BACKGROUND OF THE INVENTION

In modem aircraft fuel gauging systems, the primary sensing device is a capacitor. Capacitive fuel gauging systems are widely used for indicating the volume as well as the mass of fuel contained within fuel tanks. Such capacitance sensors have been widely accepted for many years because of their ruggedness and reliability.

A capacitive sensor, also referred to as a probe, is vertically arranged so that liquid fuel partially fills an inter-electrode space of the capacitor. The probe comprises two plates the electrical capacitance of which varies according to the relative permittivity of the fuel and the percentage of the inter-electrode volume filled with fuel. The probe is generally constructed of a pair of coaxial conductive cylinders which form the capacitor, although the technique is not limited to a cylindrical configuration. The probe is connected via a harness to a remote electronics unit. The remote electronics unit, also called a signal conditioner, performs a relative capacitance measurement to thereby produce a proportional voltage indicative of fuel level.

The process of measuring the fuel level with a capacitive probe becomes corrupted when stray capacitance from the wiring harness, which can vary temporally and among aircraft, adds to the desired capacitance in an intermittent and unpredictable way. Referring to FIG. 1, a diagram of a capacitive probe 10 connected to signal conditioning circuitry 12 is shown. A signal generator 13 provides a current on a line a to the variable capacitor 17. As described herein above, the capacitance of the capacitor 17 varies with respect to the level of fuel between the capacitor plates. A return current is provided via a diode 20 and a line b to a trans-resistance amplifier 22, which converts the return current into a voltage. The output of the amplifier 22 is provided to a detector 25, e.g., a peak detector, which provides an indication of the fuel level. A second diode 30 is provided in the probe between the capacitor and ground, via a line c, to provide DC restoration. The peak detector is responsive to the output of the amplifier 22 to provide an output voltage proportional to the composite current return from the probe. Thereafter, the output of the detector is provided to further signal conditioning circuitry to provide smoothing, empty tank offset voltage and full tank voltage adjust as is known in the art. The lines a, b and c represent the wire harness or cabling used to connect the probe 10 to the signal conditioning circuitry 12. $C_{ab}$ represents the stray capacitance between lines a and b, and $i_{ab}$ represents the current flowing through the stray capacitance $C_{ab}$. Similarly, $C_{ac}$ represents the stray capacitance between lines a and c, and $i_{ac}$ represents the current flowing through the stray capacitance $C_{ac}$.

Referring now to FIG. 2, the above probe and signal conditioning circuitry were tested with cables of different lengths to illustrate the effects of cable length and routing on the fuel reading. Cable lengths of 2 ft, 8 ft, and 16 ft (.61 m, 2.44 m, 4.88 m) were used. As can be seen from the test results, variations in cable length had a significant impact on the probe output due to stray capacitance effects.

Because of the uncertainty in measuring fuel with a variable capacitance probe, aircraft are required to maintain a larger fuel reserve than would be required if the fuel level was known with certainty. This uncertainty in fuel level has a significant impact on the range of an aircraft.

DISCLOSURE OF INVENTION

Objects of the invention include the provision of circuitry for minimizing the stray capacitance effects of cabling and signal conditioning circuitry on a capacitive liquid level probe.

Another object of the present invention is to provide circuitry which eliminates the effects of uncontrolled stray capacitance on a capacitive liquid level measurement device continuously and adaptively.

According to the present invention, two signal paths are provided between a capacitive probe sensor and signal conditioning circuitry, each signal path differing from the other according to its polarity; the signal paths conduct monopolar signals from the capacitive sensor the magnitude of which are directly related to the capacitance of the sensor, and bi-polar signals the magnitude of which are directly related to the stray capacitance in the signal lines; the combined monopolar and bipolar signal currents on each signal line are converted into voltage signals, and the voltage signals are thereafter differenced to provide a null bi-polar output while providing a constant monopolar voltage level the magnitude of which is directly related to the probe capacitor current.

The present invention provides a significant improvement over the prior art by providing a capacitive probe output signal which is essentially free of stray capacitance effects. The circuit separates the current flowing to the stray capacitance of a wire harness from the desired current flowing through the probe, and by properly processing the composite current, the component due to stray capacitance is separated and eliminated. Prior art fuel gauging systems have used alternating bi-polar current of various wave forms and pulsating monopolar current, while also maintaining control of harness configuration to produce predicable capacitance. However, none of the prior art systems have eliminated the effects of uncontrolled and unpredictable capacitance continuously and adaptively as achieved with the circuit of the present invention. The present invention therefore provides the significant advantage of providing accurate fuel level reading, thereby extending the range of the vehicle using the system of the invention.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

Figure 3:
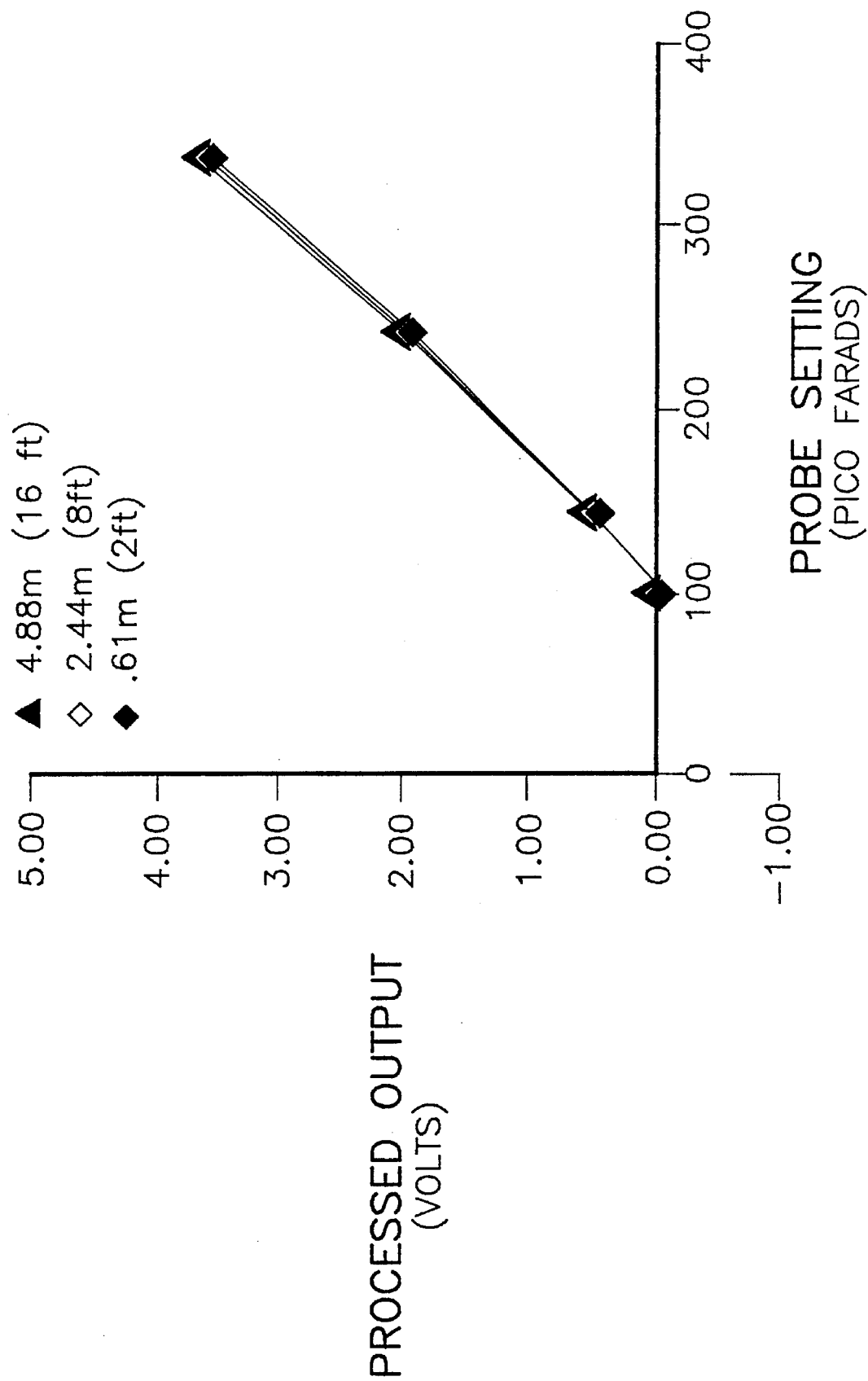
FIG. 3 is a table showing the test results of using a capacitive probe and the signal conditioning circuitry of the present invention with wire harnesses of varying lengths.

The circuitry which eliminates stray capacitance effects in a capacitive liquid measurement sensor of the present invention is particularly well suited for providing accurate liquid level readings while eliminating the effects of uncontrolled and unpredictable capacitance continuously and in an adaptive manner. Referring to FIG. 3, the signal conditioning circuitry of the present invention was tested with a capacitive meter and cables of differing lengths. As can be seen from the test results, the length of the cable between the sensor and the signal conditioning circuitry made no difference in the test results. Therefore, the system of the present invention provides a very accurate and reliable measurement of a fuel level in a fuel tank, which may be particularly important in an aircraft for increasing aircraft range because of improved accuracy in determining the remaining fuel volume.

The present invention will be described in the context of a capacitive liquid level probe used to measure the volume, as well as the mass, of fuel contained within a fuel tank. However, it will be understood by those skilled in the art that the signal conditioning circuitry of the present invention may be applicable to a variety of circuits subject to stray capacitance effects wherein the signal of interest to be measured is a monopolar signal.

Figure 1:
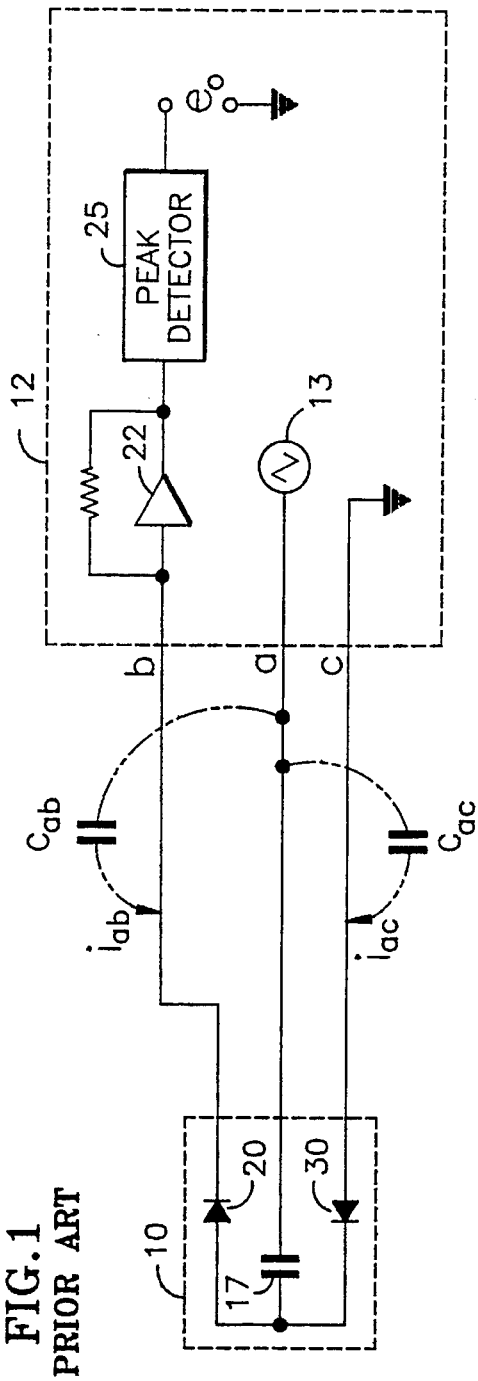
FIG. 1 is a schematic block diagram of prior art signal conditioning circuitry used to provide art output from a capacitive probe.
Figure 4:
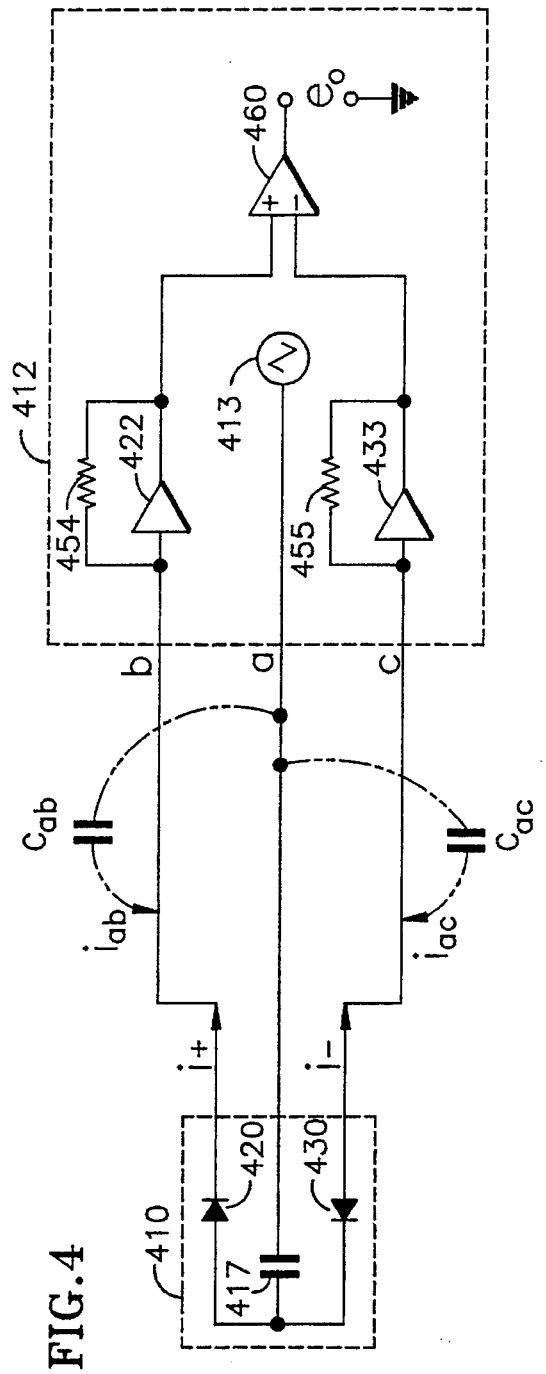
FIG. 4 is a schematic block diagram showing a capacitive probe used with signal conditioning circuitry of the present invention.
Figure 2:
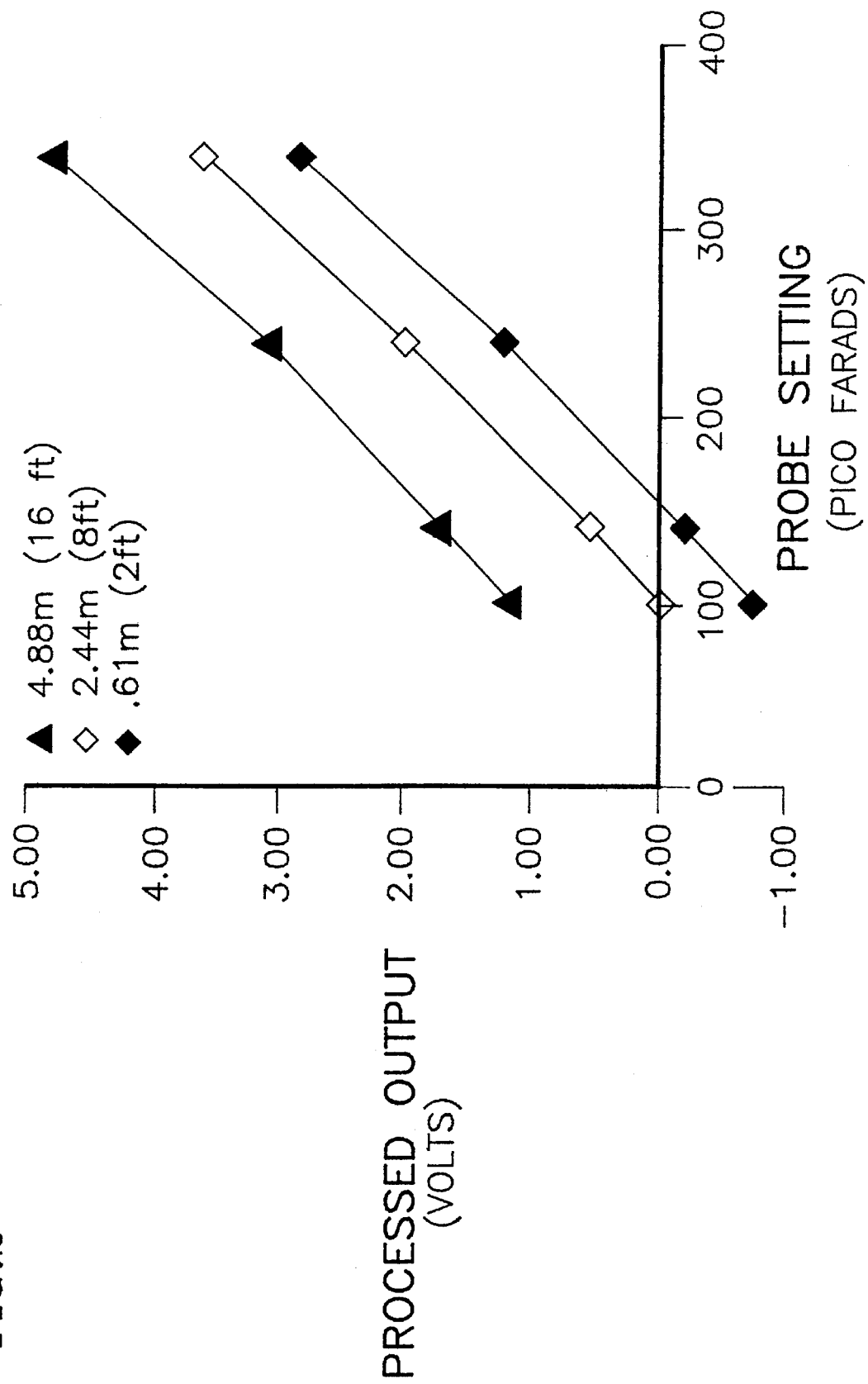
FIG. 2 is a table showing the test results of using the probe and signal conditioning circuitry of FIG. 1 with wire harnesses of varying lengths.

Referring to FIG. 4, a diagram of a capacitive probe 410 connected to the signal conditioning circuitry 412 of the present invention is shown. A signal generator 413 provides an excitation signal voltage, e.g., a 5 KHz, 10 volt peak-to-peak triangle wave, on a supply line a to a variable capacitor 417 of the probe 410. The capacitance of the capacitor 417 varies with respect to the level of fuel between the capacitor plates. A return current is provided via a probe diode 420 and a return line b to a trans-resistance amplifier 422, which converts the return current into a voltage. Similarly, a return current is provided via a second probe diode 430 and a return line c to a second trans-resistance amplifier 433. $C_{ab}$ represents the stray capacitance between lines a and b, and $i_{ab}$ represents a bipolar stray capacitance current flowing through the stray capacitance $C_{ab}$. Similarly, $C_{ac}$ represents the stray capacitance between lines a and c, and $i_{ac}$ represents the bipolar stray capacitance current flowing through the stray capacitance $C_{ac}$.

Because the three wires, a, b, and c, between the probe 410 and the signal conditioning circuitry 412 are generally uniformly twisted, the capacitive coupling between the supply line a and the return lines b,c is expected to be nearly equal. The current returned to the signal conditioning circuitry 412 at the termination of the return lines b,c is a summation of the bipolar stray capacitance current, i.e., $i_{ab}$ and $i_{ac}$ respectively, and a pulsating monopolar current, i.e., $i_+$ and $i_-$ respectively. The pulsating monopolar currents are provided by applying the excitation signal voltage to the probe capacitor 417. For example, as is known in the art, when a triangle wave is applied to a capacitor, the resulting signal output is a square wave of current. The current passing through the probe capacitor 417 is steered by the probe diodes 420,430 resulting in the monopolar currents $i_+$ and $i_-$ on the return lines b and c respectively.

Therefore, the total return current provided to the signal conditioning circuitry at the termination of return line b may be represented by the following expression:

$$i_b = i_+ + i_{ab}$$

Similarly, the total return current provided to the signal conditioning circuitry at the termination of return line c may be represented by the following expression:

$$i_c = i_- + i_{ac}$$

The trans-resistance amplifiers 422,433 convert the total return current signals, $i_b$ and $i_c$, into voltage waves, $e_b$ and $e_c$, respectively. Separate gain controls 454,455 are provided for each trans-resistance amplifier 422,433 to balance the two channels and to achieve good cancellation of the bipolar signals. The output voltage waves each have a bipolar component and a monopolar component which may be represented by the following expressions:

$$e_b = e_+ + e_{ab}$$

$$e_c = e_- + e_{ac}$$

The output voltage waves from the trans-resistance amplifiers are provided to a difference amplifier 460 which subtracts the output voltage waves. When subtracted, the matched bipolar signals essentially cancel each other out so that all that remains at the output of the difference amplifier are the monopolar signals, as represented by the following output voltage expression:

$$e_o = e_+ - e_-$$

The monopolar signals, when differenced, result in a constant voltage level, $e_o$, the magnitude of which is proportional to the probe capacitor current. This result is achieved through the realization that the monopolar signals are square waves, as described herein above, which are opposite in polarity and time shifted, e.g., 90° phase shift, from one another. When differenced, the resulting output, $e_o$, is a constant voltage level. The output voltage is thereafter provided to additional signal conditioning circuitry which provides smoothing, empty tank offset voltage and full tank voltage adjust.

Figure 5:
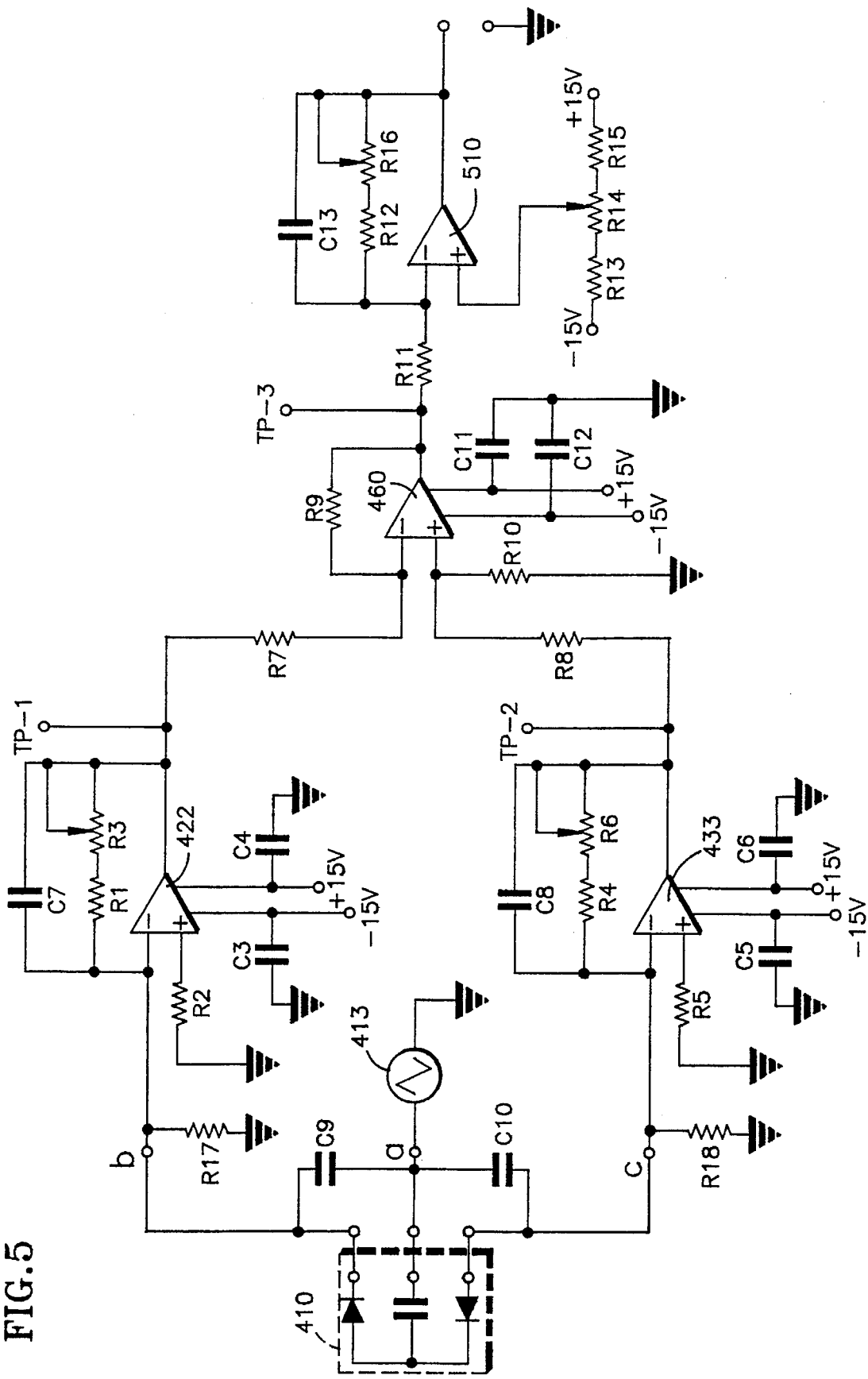
FIG. 5 is a more detailed schematic block diagram of the signal conditioning circuitry of FIG. 4.

FIG. 5 is a more detailed schematic block diagram showing an example of an implementation of the signal conditioning circuitry of the present invention. Referring to FIG. 5, the signal generator 413 is shown providing an excitation signal voltage on supply line a to the probe 410. Capacitors C9 and C10 are shown connected between the supply line a and the return lines b and c, respectively, for preloading the circuitry. For small capacitance values, the output of the probe may not be linear. Therefore, the capacitors C9 and C10 preload the circuit to provide for a linear output over the operating range of the probe. Resistors R17 and R18 are provided between the return lines b and c, respectively, and ground to provide DC returns for biasing the trans-resistance amplifiers 422,433, e.g., operational amplifiers.

The trans-resistance amplifiers are provided with power supplies, e.g., +15 v DC and −15 v DC, and capacitors C3,C4,C5,C6 are provided between the power supplies and ground to filter out high frequency noise from the power supply signal. Additionally, resistors R1 and R3 provide gain control, and capacitor C7 acts as a band limiting device to minimize high frequency response of trans-resistance amplifier 422. Similarly, resistors R4 and R6 provide gain control, and capacitor C8 acts as a band limiting device to minimize high frequency response of trans-resistance amplifier 433.

Difference amplifier 460, e.g., an operational amplifier, is provided with power supplies, e.g., +15 v DC and −15 v DC, and capacitors C11 and C12 are provided between the power supplies and ground to filter out high frequency noise from the power supply signal. A resistor R10 provides a DC return to bias the difference amplifier 460, and resistors R7, R8 and R9 are provided to control the gain of the difference amplifier.

The output of the difference amplifier 460 is provided to an amplifier 510, e.g., an operational amplifier, which sets the output level of the circuitry. Resistor R11, R12 and R16 are provided to determine the gain of the amplifier 510. Additionally, capacitor c13 is provided as a high frequency filter to smooth the output of the amplifier. Power supplies, e.g., +15 v DC and −15 v DC, and resistors R13, R14, and R15 provide a fixed DC offset for the amplifier 510.

The values of resistance and capacitance shown below in Table 1 were used to provide the results in the example of FIG. 3:

TABLE 1

| RESISTANCE | | CAPACITANCE | |
|---|---|---|---|
| R14 | 1 KΩ | C7,C8 | 33 pF |
| R13,R15 | 6.8 KΩ | C9,C10 | 47 pF |
| R3,R6,R7,R8,R9, R10,R11,R12,R16 | 10 KΩ | C13 | 0.01 μF |
| R17,R18 | 15 KΩ | C3,C4,C5,C6,C11,C12 | 0.1 μF |
| R1,R2,R4,R5 | 100 KΩ | | |

The values listed above in Table 1 were used to provide the test results in FIG. 3, and are provided by way of example only. As will be understood by those skilled in the art, different values will be required depending on the specific use of the present invention. Additionally, as will be understood by those skilled in the art, the detailed schematic of FIG. 5 is provided by way of example, and various other circuit elements and post-processing circuitry may be used with the circuit of the present invention.

Although the invention is described as being provided with a triangle wave excitation signal voltage, other time varying excitation voltage signals, e.g., a sine wave, may be used to provide the probe excitation voltage. In such a case, additional circuitry may be required to provide the desired filtering and smoothing of the signal output. Additionally, although the invention is described as using a single probe for measuring the fuel level, a plurality of probes may be used to improve reliability. Each probe will be provided with the signal conditioning circuitry of the present invention to eliminate stray capacitance effects.

The invention is described herein as using trans-resistance amplifiers 422,433 (FIG. 4) to convert the probe output current into a voltage prior to being provided to the difference amplifier 460. However, it is expected that the invention will work equally as well if the current signals are difference to provide the desired monopolar output. In this case, additional signal conditioning and filtering circuitry may be required to properly condition the signal output. The probe 410 is described herein as comprising a capacitive sensor connected on one side to the excitation current and connected on the other side to a pair of oppositely directed diodes 420,430. However, if the probe is not provided with diodes, the diodes may be provided as part of the signal conditioning circuitry of the present invention.

Although the invention has been described and illustrated with respect to exemplary embodiments thereof, it should be understood by those skilled in the art that the foregoing and various other changes, omissions, and additions may be made therein and thereto, without departing from the spirit and scope of the present invention.

We claim:

1. Circuitry for minimizing the effects of stray capacitance on the output of a capacitive liquid level measurement system, comprising:

a capacitive sensor for mounting in a liquid storage container, the sensor having a capacitance the magnitude of which varies according to the liquid level in said storage container;

voltage supply means for providing a time varying voltage to one side of said capacitive sensor;

a pair of diodes connected to the other side of said capacitive sensor, said pair of diodes being oppositely directed from one another to thereby provide two signal paths from said other side of said capacitive sensor, each signal path differing from the other according to the polarity of signals conducted thereon;

each of said signal paths conducting a current signal having a monopolar component corresponding to current flowing through said capacitive sensor and a bipolar component corresponding to current flowing through stray capacitance;

said circuitry being characterized by:

conversion means connected to each of said signal paths for providing a voltage signal the magnitude of which is related to the magnitude of said current signal being conducted by said signal path; and difference means connected to said conversion means for providing a difference signal indicative of the difference between said voltage signals, the magnitude of said difference signal being indicative of said liquid level.

2. Circuitry according to claim 1 wherein said conversion means is a trans-resistance amplifier.

3. Circuitry according to claim 2 wherein said difference means is a difference amplifier.

4. Circuitry according to claim 3 further comprising an amplifier for amplifying said difference signal.

5. Circuitry according to claim 1 wherein said liquid storage container is a fuel tank and wherein said liquid is fuel.

6. Circuitry according to claim 4 wherein said liquid storage container is a fuel tank and wherein said liquid is fuel.

7. Circuitry for minimizing the effects of stray capacitance on the output of a capacitive liquid level measurement system, comprising:

at least one capacitive sensor for mounting in a liquid storage container, each capacitive sensor having a capacitance the magnitude of which varies according to the liquid level in said storage container;

voltage supply means connected to each said capacitive sensor for providing a time varying voltage to one side of each said capacitive sensor; and a pair of diodes connected to a second side of each of said capacitive sensors, said pair of unilaterally conducting means being oppositely directed from one another to thereby provide two signal paths from said second side of each of said capacitive sensors, each signal path in a corresponding pair of signal paths differing from the other signal path according to the polarity of signals conducted thereon;

said circuitry being characterized by:

difference means connected to each signal path of said corresponding pair of signal paths for providing difference signals indicative of the difference between said signals on each said signal path of said corresponding pair of signal paths, the magnitude of said difference signals being indicative of said liquid level.

8. Circuitry according to claim 7 wherein each of said signal paths conducts a current signal having a monopolar component corresponding to current flowing through said capacitive sensor and a bipolar component corresponding to current flowing through stray capacitance.

9. Circuitry according to claim 8 further comprising:

conversion means connected to each of said signal paths for providing a voltage signal the magnitude of which is related to the magnitude of said current signal being conducted by said signal path:

said difference signal being indicative of the difference between corresponding pairs of said voltage signals.

10. Circuitry according to claim 9 wherein said difference means is a difference amplifier.

11. Circuitry according to claim 10 wherein said conversion means is a trans-resistance amplifier.

12. Circuitry according to claim 11 wherein said liquid storage container is a fuel tank and wherein said liquid is fuel.

13. Circuitry according to claim 7 wherein said liquid storage container is a fuel tank and wherein said liquid is fuel.

14. A method for minimizing the effects of stray capacitance on the output of a capacitive liquid level measurement system, the system having a capacitive sensor for mounting in a liquid storage container, said capacitive sensors having a capacitance the magnitude of which varies according to the liquid level in said storage container, the method comprising the steps of:

providing a time varying voltage to one side of said capacitive sensors;

providing two signal paths from said other side of said capacitive sensors, each signal path differing from the other signal path according to the polarity of signals conducted thereon; and providing difference signals indicative of the difference between said signals on said signal paths, the magnitude of said difference signals being indicative of said liquid level.

15. The method of claim 14 wherein each of said signal paths conducts a current signal having a monopolar component corresponding to current flowing through said capacitive sensor and a bipolar component corresponding to current flowing through stray capacitance.

16. The method according to claim 15 further comprising the steps of:

providing voltage signals the magnitudes of which are related to the magnitude of each respective current signal being conducted by said signal paths; and said difference signal being indicative of the difference between corresponding pairs of said voltage signals.

17. The method according to claim 16 wherein said liquid storage container is a fuel tank and wherein said liquid is fuel.

18. The method according to claim 14 wherein said liquid storage container is a fuel tank and wherein said liquid is fuel.

* * * * *